United States Patent
Mitran (10) Patent No.: US 8,490,073 B2
(45) Date of Patent: Jul. 16, 2013

(54) CONTROLLING TRACING WITHIN COMPILED CODE

(75) Inventor: Marcel Mitran, Markham (CA)

(73) Assignee: International Business Machines Corporation, Armonk, NY (US)

(*) Notice: Subject to any disclaimer, the term of this patent is extended or adjusted under 35 U.S.C. 154(b) by 1451 days.

(21) Appl. No.: 11/693,787

(22) Filed: Mar. 30, 2007

(65) Prior Publication Data

US 2008/0244530 A1 Oct. 2, 2008

(51) Int. Cl.
*G06F 9/44* (2006.01)
*G06F 9/45* (2006.01)

(52) U.S. Cl.
USPC ........... 717/158; 717/128; 717/138; 717/140; 717/148; 717/130

(58) Field of Classification Search
None
See application file for complete search history.

(56) References Cited

U.S. PATENT DOCUMENTS

| | | | | |
|---|---|---|---|---|
| 5,047,919 A * | 9/1991 | Sterling et al. | ............... | 714/47.3 |
| 5,265,254 A * | 11/1993 | Blasciak et al. | ............... | 717/130 |
| 5,450,586 A * | 9/1995 | Kuzara et al. | ................ | 717/124 |
| 6,513,154 B1 * | 1/2003 | Porterfield | .................... | 717/101 |
| 6,553,564 B1 * | 4/2003 | Alexander et al. | ........... | 717/128 |
| 6,654,949 B1 * | 11/2003 | Fraenkel et al. | .............. | 717/130 |
| 6,732,355 B1 | 5/2004 | Ogasawara | .................... | 717/128 |
| 6,738,965 B1 | 5/2004 | Webster | ........................ | 717/128 |
| 7,007,269 B2 * | 2/2006 | Sluiman et al. | ............... | 717/130 |
| 7,085,915 B1 * | 8/2006 | St. John et al. | ............... | 712/205 |
| 7,107,585 B2 | 9/2006 | Berent et al. | .................... | 717/154 |
| 7,747,989 B1 * | 6/2010 | Kissell | .......................... | 717/148 |
| 7,882,396 B2 * | 2/2011 | Bolignano et al. | .............. | 714/37 |
| 2002/0066081 A1 | 5/2002 | Duesterwald et al. | ......... | 717/128 |
| 2002/0104075 A1 * | 8/2002 | Bala et al. | ..................... | 717/136 |
| 2002/0138788 A1 * | 9/2002 | Yenne et al. | .................... | 714/38 |
| 2002/0199172 A1 * | 12/2002 | Bunnell | ........................ | 717/128 |
| 2003/0093649 A1 | 5/2003 | Hilton | .............................. | 712/41 |
| 2003/0145313 A1 | 7/2003 | Kalogeropulos | ............. | 717/156 |
| 2003/0159133 A1 * | 8/2003 | Ferri et al. | ..................... | 717/130 |
| 2005/0044538 A1 * | 2/2005 | Mantripragada | ............. | 717/151 |
| 2005/0050523 A1 * | 3/2005 | Ageyev et al. | ................ | 717/128 |
| 2005/0144605 A1 * | 6/2005 | Motokawa et al. | ........... | 717/160 |
| 2005/0283676 A1 * | 12/2005 | Begg et al. | ....................... | 714/38 |
| 2006/0059146 A1 * | 3/2006 | McAllister et al. | ............... | 707/6 |
| 2006/0101416 A1 * | 5/2006 | Callahan et al. | ............... | 717/128 |
| 2006/0200806 A1 * | 9/2006 | Tasinga | .......................... | 717/128 |
| 2008/0005730 A1 * | 1/2008 | Inamdar | ......................... | 717/158 |
| 2010/0088683 A1 * | 4/2010 | Golender et al. | ............. | 717/128 |
| 2011/0010715 A1 * | 1/2011 | Papakipos et al. | ............. | 718/100 |

OTHER PUBLICATIONS

Gal et al., "HotpathVM: an effective JIT compiler for resource-constrained devices," ACM, 2006.*
Suganuma, T., et al., "Overview of the IBM Java Just-In-Time Compiler," IBM Systems Journal, vol. 29, No. 1, 2000 (no further date information available), pp. 1-13.

(Continued)

*Primary Examiner* — Insun Kang
(74) *Attorney, Agent, or Firm* — Steven Chiu, Esq.; Kevin P. Radigan, Esq.; Heslin Rothenberg Farley & Mesiti P.C.

(57) ABSTRACT

Tracing within a processing environment is controlled. Trace directives are automatically included within code being compiled in order to control where one or more traces begin and end within the code. The trace directives provide a framework for mapping traces to well understood boundaries of the code.

20 Claims, 4 Drawing Sheets

OTHER PUBLICATIONS

Tang, V., et al., "A Framework for Reducing Instruction Scheduling Overhead in Dynamic Compilers," In CASCON '06: Proceedings of the 2006 conference of the Center for Advanced Studies on Collaborative research, 2006 (no further date information available), pp. 1-4.

Suganuma, T. et al., "A Dynamic Optimization Framework for a Java Just-In-Time Compiler," OOPSLA '01 Proceedings of the 16th ACM SIGPLAN conference on Object-oriented programming, systems, languages, and applications, 2001 (no further date information available), pp. 180-194.

Waldspurger, Carl A., "Memory Resource Management in VMware ESX Server," Proceedings of the 5th Symposium on Operating Systems Design and Implementation, Dec. 2002, pp. 1-16.

"z/Architecture Principles of Operation," IBM Publication No. SA22-7832-04, Sep. 2005.

* cited by examiner fig. 1 fig. 2 fig. 3 fig. 4 fig. 5

CONTROLLING TRACING WITHIN COMPILED CODE

TECHNICAL FIELD

This invention relates, in general, to performing tracing within a processing environment, and in particular, to controlling tracing within code being compiled within the processing environment.

BACKGROUND OF THE INVENTION

A trace includes one or more consecutively executed instructions. In particular, sequences of instructions, such as emulated instructions, are dynamically compiled into a more compact sequence of native instructions. Such sequences are called traces. Traces are distinct from traditional compilation frameworks in that typical program boundaries, such as functions, methods, modules, components, etc., are not recognized. Traces simply absorb the execution stream of the program irrespective of such boundaries.

With no visibility into the program boundaries, there are inherent difficulties for compiler developers to deal with trace frameworks. The lack of handles on program units makes control over what gets compiled very difficult to define. Any perturbation of the execution order of the system from startup onwards can cause the execution of the problem area to either move to an unpredictable point in execution or to simply remove the execution of such an area making observation, reproduction and handling of problems very difficult. This can have a tremendous impact on productivity.

SUMMARY OF THE INVENTION

Based on the foregoing, a need exists for a capability to control tracing within processing environments, such as emulated environments. In particular, a need exists for a capability that enables the including of trace directives within compiled code at well understood boundaries, thereby providing a mechanism to control and repeat trace compilation and execution.

The shortcomings of the prior art are overcome and additional advantages are provided through the provision of an article of manufacture that includes at least one computer usable medium having computer readable program code logic to control tracing within a processing environment. The computer readable program code logic when executing performing, for instance, the following: compiling code for which one or more traces are to be produced; and automatically including, during compiling, one or more trace directives in the code, the one or more trace directives controlling tracing of the code.

Methods and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, a capability is provided for controlling tracing within a processing environment. In particular, trace directives are automatically included within code being compiled in order to control where a trace begins and ends within the code. These trace directives provide a framework for mapping traces to well understood boundaries of the code, thereby providing control and repeatability of trace compilation and execution.

In one example, the code is being compiled by a dynamic compiler, such as a Just-In-Time compiler, running within an emulator. Emulators typically improve performance by using underlying translation technology to dynamically compile sequences of instructions being emulated into a more compact sequence of native instructions, called traces. As described above, the traces are distinct from traditional compilation frameworks in that typical program boundaries, such as functions, methods, modules, components, etc., are not recognized. Traces simply absorb the execution stream of the emulator irrespective of such boundaries. For example,

```
function_A
  instA0
  instA1
  call Function B
  instA2
  instA3
end_A
function_B
  instB0
  instB1
end_B
```

With no visibility into the boundary points, function_A, end_A, function_B or end_B, a trace for the above program could be:

```
Trace_0
...
instA0
instA1
call Function B
instB0
instB1
instA2
instA3
...
```

In such a case, the trace does not map to particular functions within the code and it is very difficult to define the exact trace desired. Thus, in accordance with an aspect of the present invention, pseudo-instructions are used to instruct the emulator where a trace point should begin and end. Examples of these pseudo-instructions include START_TRACE and END_TRACE. When the emulator sees a START_TRACE directive in the assembler stream, it begins collection of instructions for a trace until it sees another START_TRACE directive or a coupled END_TRACE directive. By placing START_TRACE at the method entry points or return points following a call, and END_TRACE at method exit points in a compiled method, the mapping of trace definitions to method definitions can be made very similar, providing significantly more reproducibility to trace compiler developers, as well as a handle on the definition of traces. For example:

```
function_A
TRACE_START
instA0
instA1
TRACE_END
call Function B
TRACE_START
instA2
instA3
TRACE_END
end_A
function_B
TRACE_START
instB0
instB1
TRACE_END
end_B
```

For this sequence, the traces produced are:

```
TRACE0
instA0
instA1
TRACE1
instB0
instB1
TRACE2
instA2
instA3
where TRACE0 and TRACE2 map to function_A, and TRACE1 maps to function_B.
```

The controlling of tracing within a processing environment is described in further detail herein. One embodiment of a processing environment to incorporate and use one or more aspects of the present invention is described with reference to FIG. 1. In this example, a processing environment 100 is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation, Armonk, N.Y. Aspects of the z/Architecture® are described in "z/Architecture Principles of Operation," IBM Publication No. SA22-7832-04, September 2005, which is hereby incorporated herein by reference in its entirety.

Figure 1:
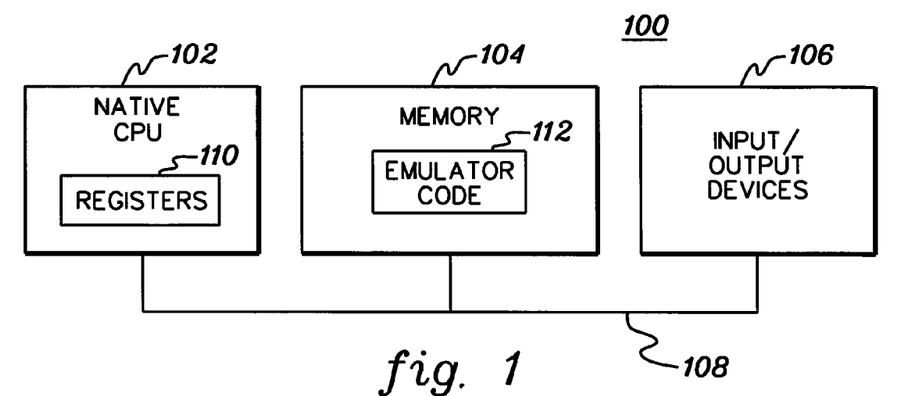
FIG. 1 depicts one embodiment of a processing environment to incorporate and use one or more aspects of the present invention.

Processing environment 100 includes, for instance, a native processor 102 (e.g., a central processing unit (CPU)), a memory 104 (e.g., main memory) and one or more input/output (I/O) devices 106 coupled to one another via, for example, one or more buses 108. As examples, processor 102 is a part of a pSeries® server offered by International Business Machines Corporation (IBM®), Armonk, N.Y. IBM®, pSeries®, Power PC®, and z/Architecture® are registered trademarks of International Business Machines Corporation, Armonk, N.Y., U.S.A. Intel® is a registered trademark of Intel Corporation. Other names used herein may be registered trademarks, trademarks or product names of International Business Machines Corporation or other companies.

Native central processing unit 102 includes one or more native registers 110, such as one or more general purpose registers and/or one or more special purpose registers, used during processing within the environment. These registers include information that represent the state of the environment at any particular point in time.

Moreover, native central processing unit 102 executes instructions and code that are stored in memory 104. In one particular example, the central processing unit executes emulator code 112 stored in memory 104. This code enables the processing environment configured in one architecture to emulate another architecture. For instance, emulator code 112 allows machines based on architectures other than the z/Architecture®, such as pSeries® servers, to emulate the z/Architecture® and to execute software and instructions developed based on the z/Architecture®.

Figure 2:
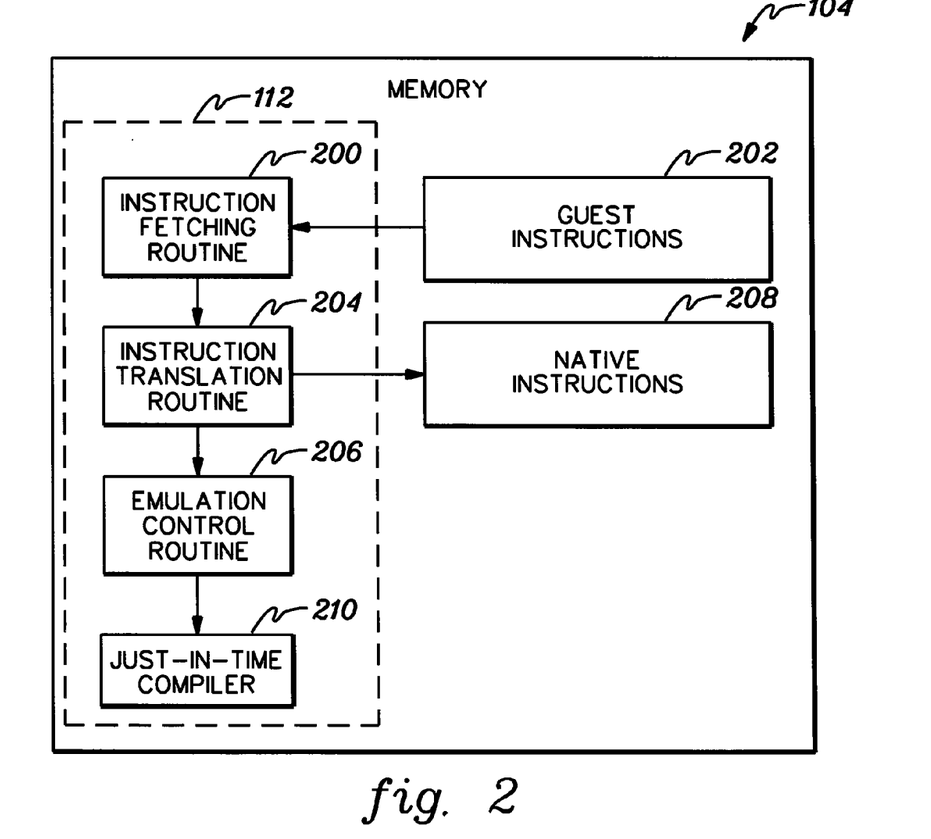
FIG. 2 depicts further details of one embodiment of the memory of FIG. 1, in accordance with one or more aspects of the present invention.

Further details relating to emulator code 112 (a.k.a., emulator) are described with reference to FIG. 2. In one example, emulator code 112 includes an instruction fetching routine 200 to obtain one or more guest instructions 202 from memory 104, and to optionally provide local buffering for the one or more obtained instructions. Guest instructions 202 comprise software instructions (e.g., machine instructions) that were developed to be executed in an architecture other than that of native CPU 102. For example, guest instructions 202 may have been designed to execute on a z/Architecture® processor, but are instead being emulated on native CPU 102, which may be, for instance, a pSeries® server.

Emulator 112 also includes an instruction translation routine 204 to determine the type of guest instruction that has been obtained and to translate the guest instruction into one or more corresponding native instructions 208. This translation includes, for instance, identifying the function to be performed by the guest instruction and choosing the native instructions to perform that function.

Further, emulator 112 includes an emulation control routine 206 to cause the native instructions to be executed. Emulation control routine 206 may cause native CPU 102 to execute a routine of native instructions that emulate one or more previously obtained guest instructions and, at the conclusion of such execution, to return control to the instruction fetching routine to emulate the obtaining of the next guest instruction or guest instructions. Execution of native instructions 208 may include loading data into a register from memory 104; storing data back to memory from a register; or performing some type of arithmetic or logical operation, as determined by the translation routine.

Each routine is, for instance, implemented in software, which is stored in memory and executed by native central processing unit 102. In other examples, one or more of the routines or operations are implemented in firmware, hardware, software or some combination thereof. The registers of the emulated guest processor may be emulated using registers 110 of the native CPU or by using locations in memory 104. In one or more embodiments, guest instructions 202, native instructions 208, and emulator code 112 may reside in the same memory or may be dispersed among different memory devices.

An accumulation of instructions that have been processed by the fetch and control routines is further provided, in one embodiment, to a Just-In-Time compiler 210. The Just-In-Time compiler is a dynamic compiler that examines the instructions, looks for opportunities to remove redundancies and generates a matching sequence of instructions on the native platform on which the emulator is running. While the emulator has visibility to one instruction at a time, the Just-In-Time compiler has visibility to a sequence of instructions. Since it has visibility to a sequence of instructions, it can attempt to look for redundancies in the sequence of instructions and remove them. One example of a Just-In-Time compiler is the JAVA™ Just-in-Time (JIT) compiler offered by International Business Machines Corporation, Armonk, N.Y. JAVA is a trademark of Sun Microsystems, Inc., Santa Clara, Calif.

An overview of the JAVA JIT compiler is described in "Overview of the IBM Just-in-Time Compiler," T. Suganuma et al., IBM Systems Journal, Volume 39, Number 1, 2000, which is hereby incorporated herein by reference in its entirety. Aspects of a JIT compiler are also described in, for instance, "A Framework For Reducing Instruction Scheduling Overhead In Dynamic Compilers," V. Tang, J. Siu, A. Vasilevskiy, M. Mitran, Proceedings of the 2006 Conference of the Center for Advanced Studies on Collaborative research, Article 5, 2006; "A Dynamic Optimization Framework For A Java Just-In-Time Compiler," T. Suganuma, T. Yasue, M. Kawahito, H. Komatsu and T. Nakatani, ACM SIGPLAN, Volume 36, Issue 11, November 2001; and "Memory Resource Management in VMware ESX Server," C.A. Waldspurger, In Proc. Fifth Symposium on Operating Systems Design and Implementation (OSDI '02), December 2002, each of which is hereby incorporated herein by reference in its entirety.

Figure 3:
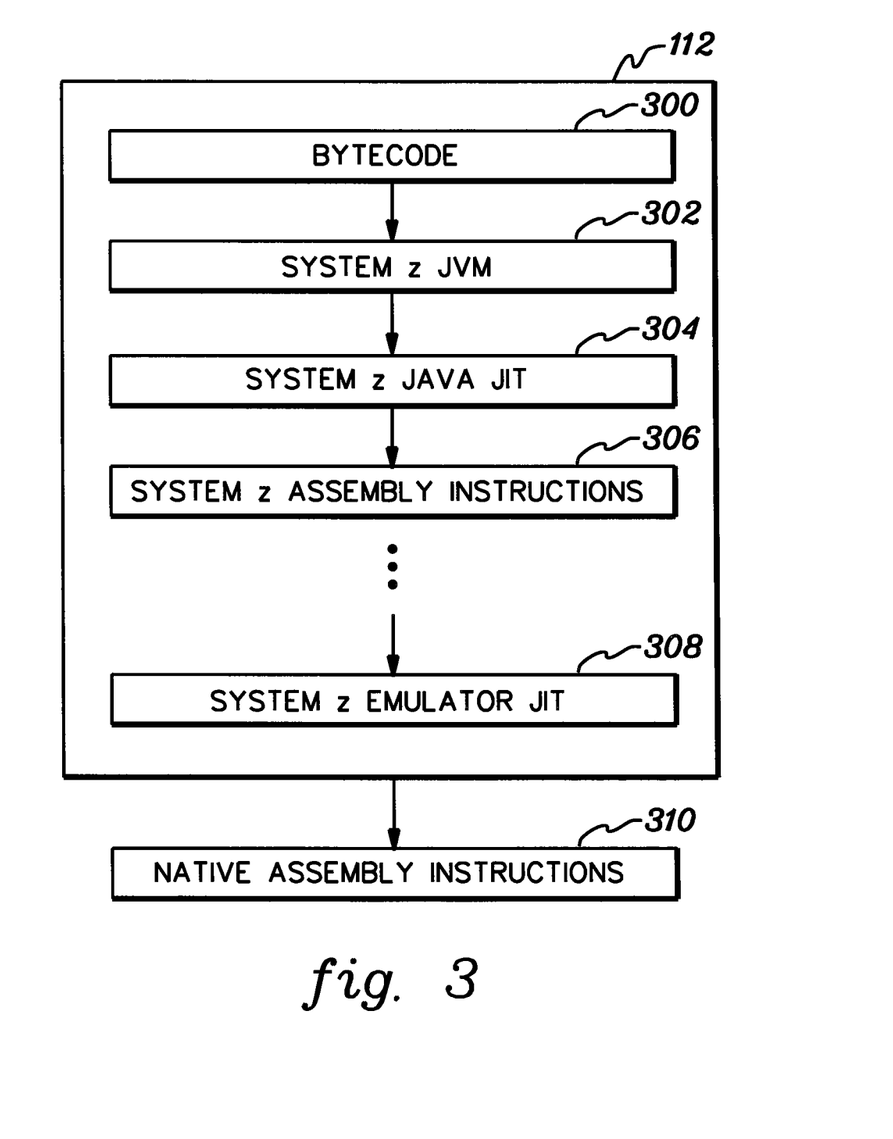
FIG. 3 depicts further details of emulator code executing within the processing environment of FIG. 1, in accordance with an aspect of the present invention.

Further details regarding emulator 112 are described with reference to FIG. 3. In one example, emulator code 112 runs JAVA software, which generates bytecodes 300 that are included in a class file. This class file is fed to a JAVA Virtual Machine (JVM) 302, which interprets and executes the bytecodes. In one example, the JVM is a System z JVM offered by International Business Machines Corporation.

Associated with the JAVA Virtual Machine is a JAVA Just-In-Time compiler 304. This JIT is in addition to JIT 210 (FIG. 2). JIT 304 (FIG. 3) works with the JAVA Virtual Machine to take the bytecodes and translate those bytecodes into one or more assembly instructions 306 that eventually target the native platform on which JAVA is running. At some point in time, JIT 304 determines that a certain sequence of instructions has been observed enough or are important enough in the execution of the emulator that those instructions should be translated by the JIT into native assembly instructions. Thus, JIT 304 provides System z assembly instructions 306, guest instructions, which are fetched by an instruction fetching unit and translated by an instruction translation routine, into native instructions 310. Further, a JIT 308 examines the native instructions and generates a refined matching sequence of instruction 310 on the native platform on which the emulator is running. These native instructions, which emulate the guest instructions, are then executed on the native platform.

At times, it is desirable to trace the emulator code or other code executing within the environment to determine whether there is an error and if an error, where the error lies. In accordance with an aspect of the present invention, the tracing is facilitated by controlling where the tracing begins and/or ends in the compiled code. This is described in further detail with reference to FIG. 4.

Figure 4:
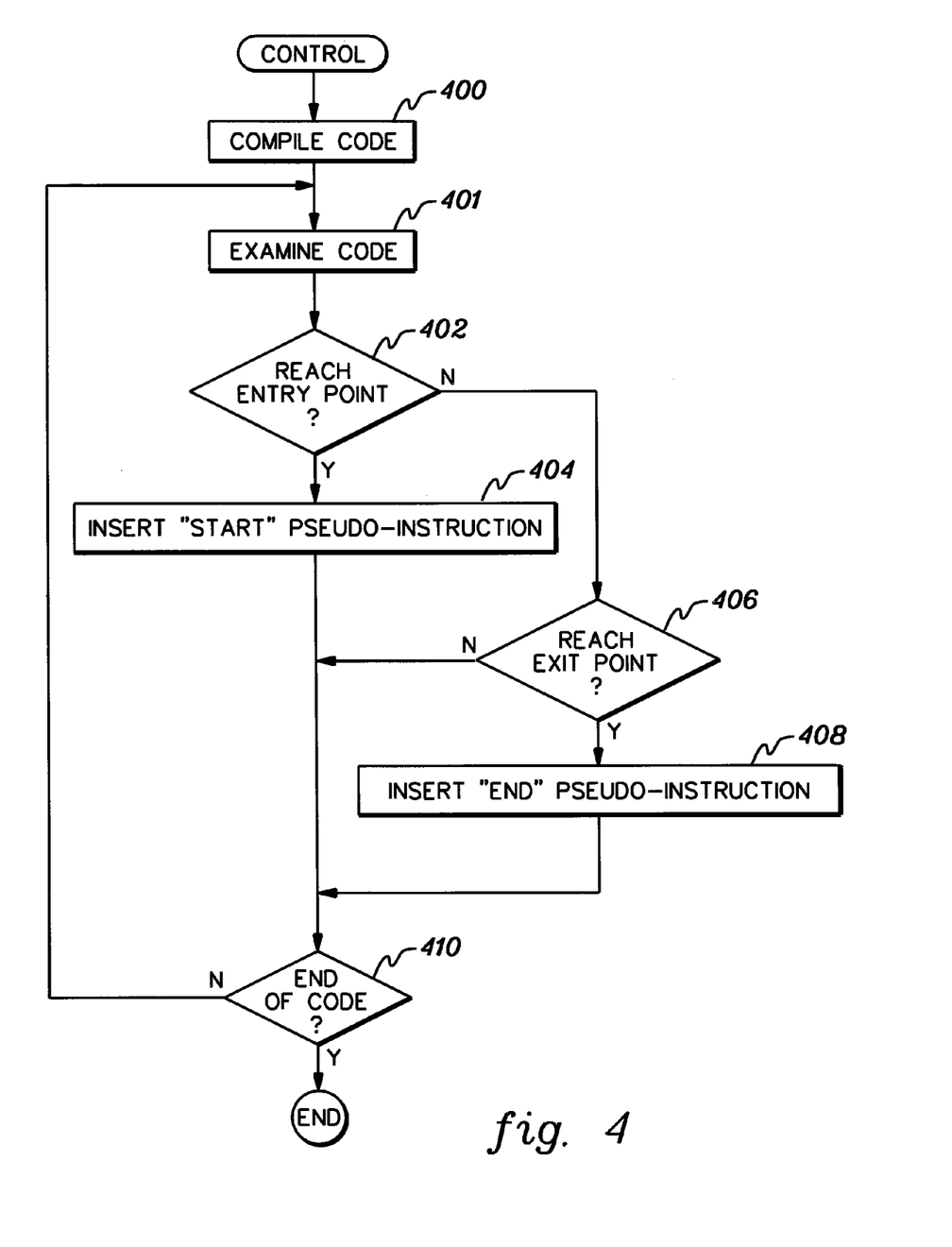
FIG. 4 depicts one embodiment of the logic associated with controlling tracing within the processing environment, in accordance with an aspect of the present invention.

Referring to FIG. 4, during compilation of code to be traced, STEP 400, each line of code (or selected lines) is examined by the compiler to determine if a trace directive is to be inserted in the code by the compiler, STEP 401. For example, a determination is made as to whether the System z assembly instruction generated during compilation by the System z JAVA JIT is an entry point for the code (e.g., method, function, module or component entry point), INQUIRY 402. If it is an entry point, then a START_TRACE directive is added to the code, STEP 404. This START_TRACE directive is, for instance, a pseudo instruction included in the assembly instructions that directs the emulator to start a trace. In particular, the pseudo instruction indicates that a recording routine within the emulator is to begin recording. This recorded information is stored, for instance, within a memory buffer.

Additionally, if the examined code is not an entry point, a determination is made as to whether it is an exit point, INQUIRY 406. If it is an exit point, then an END_TRACE pseudo instruction is included in the compiled code, STEP 408, to instruct the emulator to stop tracing.

If it is not an entry or exit point, or after inserting the start pseudo-instruction, a determination is made as to whether the end of code has been reached, INQUIRY 410. If the end of the code has not been reached, then as the code is compiled, checks are made or continue to be made for entry and exit points. At each entry and exit point, a START_TRACE or END_TRACE pseudo instruction is inserted, in this example.

Since it is known that a START_TRACE or END_TRACE pseudo instruction is inserted at the entry and exit points of the compiled code, the traces can be mapped to those defined points. This allows the traces to be controlled and to be repeated.

When the emulator observes a START_TRACE directive in the assembly stream, it begins collection of instructions for a trace until it sees another START_TRACE directive or a coupled END_TRACE directive. By placing START_TRACE at the method entry points or return points following a call, and END_TRACE directives at method exit points in a compiled method, the mapping of trace definitions to method definitions can be made very easily, providing significantly more reproducibility to trace compiler developers, as well as a handle on the definition of the traces. That is, since it is known where the trace directives are inserted, it is known where particular code begins and ends. This allows tracing of code determined to have an error to be repeated, etc.

Described in detail herein is a capability for controlling tracing within emulated compiled code. The compiler executing within the emulator is controlled, as well as the emulator itself, enabling the tracing to be controlled.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 5:
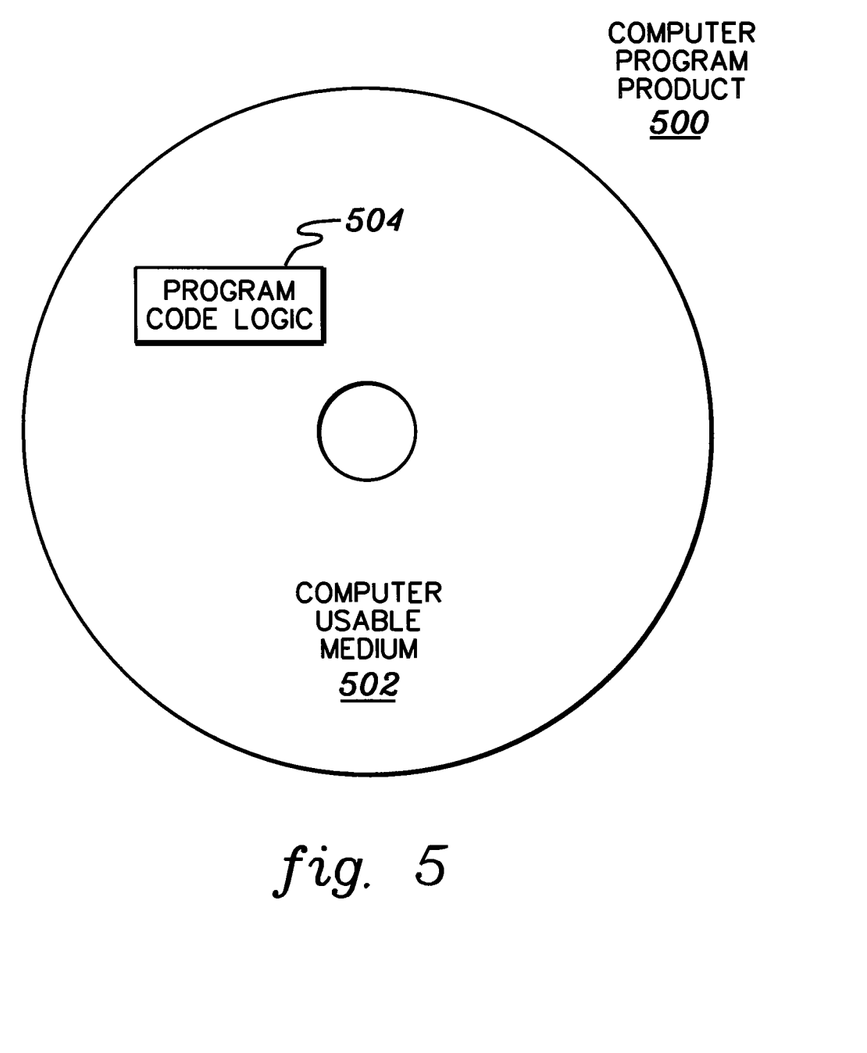
FIG. 5 depicts one embodiment of a computer program product to incorporate one or more aspects of the present invention.

One example of an article of manufacture or a computer program product incorporating one or more aspects of the present invention is described with reference to FIG. 5. A computer program product 500 includes, for instance, one or more computer usable media 502 to store computer readable program code means or logic 504 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for controlling tracing within an emulated processing environment. This framework lends itself to dynamically compiled languages, where compiled code is generated at runtime (Just-In-Time). This provides an opportunity to guarantee that the underlying hardware is indeed emulated, hence making insertion of the pseudo instructions safe. Additionally, no explicit requirement for recompiling DLL is needed.

Although various embodiments are described above, these are only examples. For instance, one or more aspects of the present invention can be used in emulated environments that have a native architecture that is different than the one described above and/or emulates an architecture other than the z/Architecture®. Various emulators can be used. Emulators are commercially available and offered by various companies. Additional details relating to emulation are described in *Virtual Machines: Versatile Platforms for Systems and Processes* (*The Morgan Kaufmann Series in Computer Architecture and Design*), Jim Smith and Ravi Nair, Jun. 3, 2005, which is hereby incorporated herein by reference in its entirety.

Further, the processing environment can include multiple central processing units, each having an emulator and providing a guest operating system and guest applications. As further examples, the emulator and the various components of the emulator can be different than described herein or there can be additional or less components then described herein. Further, the processing environment can include processing units that are based on architectures other than Power4, Power PC® or Intel®. Additionally, servers other than pSeries® servers can incorporate and use one or more aspects of the present invention.

Even further, in one or more embodiments, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for controlling tracing within a processing environment, said computer program product comprising:
   a non-transitory computer readable storage medium readable by a processing circuit and storing instructions for execution by the processing circuit for performing a method comprising;
      compiling, by a dynamic compiler of an emulator running on a native processor, guest code for which one or more traces are to be produced, the emulator emulating a guest architecture on the native processor including emulating execution of the guest code on the native processor, the guest code developed for a processor of the guest architecture;
      automatically determining, by the compiler during the compiling, based on the compiled code itself, where one or more trace directives are to be included in the compiled code, wherein the automatically determining comprises examining the compiled code, by the compiler, for at least one of an entry point or an exit point for the compiled code and selecting by the compiler the at least one entry point or exit point as a place to include the one or more trace directives; and
      automatically including, by the compiler during the compiling, the one or more trace directives in the compiled code based on the automatically determining, said one or more trace directives setting a start or end point for use by the emulator in mapping one or more trace statements to the compiled code.

2. The computer program product of claim 1, wherein the one or more trace directives are instructions to the emulator.

3. The computer program product of claim 1, wherein the automatically including comprises automatically including the one or more trace directives at one or more defined boundaries of the compiled code.

4. The computer program product of claim 3, wherein the one or more defined boundaries comprise at least one method definition within the compiled code.

5. The computer program product of claim 1, wherein the dynamic compiler comprises a Just-In-Time compiler.

6. The computer program product of claim 1, wherein the dynamic compiler is a component of the emulator, said emulator running on a native system architecture.

7. The computer program product of claim 1, wherein the one or more trace directives include one or more pseudo-instructions instructing the emulator where at least one trace is to begin and end.

8. The computer program product of claim 1, wherein the selection is based exclusively on existence of the at least one entry point or exit point and absent a user directive of where to include the one or more trace directives.

9. The computer program product of claim 1, wherein the method further comprises:
   the compiler generating assembly instructions based on the guest code; and
   wherein the automatically determining comprises the compiler examining the assembly instructions to determine where the one or more trace directives are to be included.

10. The computer program product of claim 1, wherein the processor of the guest architecture is a hardware processor.

11. A method of controlling tracing within a processing environment, said method comprising:
   compiling, by a dynamic compiler of an emulator running on a native processor, guest code for which one or more traces are to be produced, the emulator emulating a guest architecture on the native processor including emulating execution of the guest code on the native processor, the guest code developed for a processor of the guest architecture;
   automatically determining, by the compiler during the compiling, based on the compiled code itself, where one or more trace directives are to be included in the compiled code, wherein the automatically determining comprises examining the compiled code, by the compiler, for at least one of an entry point or an exit point for the compiled code and selecting by the compiler the at least one entry point or exit point as a place to include the one or more trace directives; and
   automatically including, by the compiler during the compiling, the one or more trace directives in the compiled code based on the automatically determining, said one or more trace directives setting a start or end point for use by the emulator in mapping one or more trace statements to the compiled code.

12. The method of claim 11, wherein the automatically including comprises automatically including the one or more trace directives at one or more defined boundaries of the compiled code.

13. The method of claim 11, wherein said dynamic compiler is a component of the emulator, said emulator running on a native system architecture.

14. The method of claim 11, wherein the one or more trace directives include one or more pseudo-instructions instructing the emulator where at least one trace is to begin and end.

15. The method of claim 11, wherein the selection is based exclusively on existence of the at least one entry point or exit point and absent a user directive of where to include the one or more trace directives.

16. A computer system of controlling tracing within a processing environment, said computer system comprising:
   a memory; and
   a processor in communications with the memory, wherein the computer system is configured to perform a method, said method comprising:
      compiling, by a dynamic compiler of an emulator running on a native processor, guest code for which one or more traces are to be produced, the emulator for emulating a guest architecture on the native processor including emulating execution of the guest code on the native processor, the guest code developed for a processor of the guest architecture;
      automatically determining, by the compiler during the compiling, based on the compiled code itself, where one or more trace directives are to be included in the compiled code, wherein the automatically determining comprises examining the compiled code, by the compiler, for at least one of an entry point or an exit point for the compiled code and selecting by the compiler the at least one entry point or exit point as a place to include the one or more trace directives; and
      automatically including, by the compiler during the compiling, the one or more trace directives in the compiled code based on the automatically determining, said one or more trace directives setting a start or end point for use by the emulator in mapping one or more trace statements to the compiled code.

17. The computer system of claim 16, wherein the compiler automatically includes the one or more trace directives at one or more defined boundaries of the compiled code.

18. The computer system of claim 16, wherein the compiler is a component of the emulator, said emulator running on a native system architecture.

19. The computer system of claim 16, wherein the one or more trace directives include one or more pseudo-instructions instructing the emulator where at least one trace is to begin and end.

20. The computer system of claim 16, wherein the selection is based exclusively on existence of the at least one entry point or exit point and absent a user directive of where to include the one or more trace directives.

* * * * *